United States Patent [19]

Kruder et al.

[11] Patent Number: 5,375,992
[45] Date of Patent: * Dec. 27, 1994

[54] TRIPLE CHANNEL WAVE SCREW

[75] Inventors: George A. Kruder, Mount Gilead; William N. Calland, Columbus, both of Ohio

[73] Assignee: HPM Corporation, Mount Gilead, Ohio

[*] Notice: The portion of the term of this patent subsequent to Jun. 15, 2010 has been disclaimed.

[21] Appl. No.: 14,781

[22] Filed: Feb. 8, 1993

Related U.S. Application Data

[63] Continuation of Ser. No. 714,861, Jun. 13, 1991, Pat. No. 5,219,590.

[51] Int. Cl.⁵ ............................................. B29B 7/42
[52] U.S. Cl. .............................. 425/208; 264/349; 366/89; 366/90
[58] Field of Search ............... 425/200, 207, 208, 190; 264/211.21, 211.23, 349; 366/77, 79, 88, 89, 90, 323

[56] References Cited

U.S. PATENT DOCUMENTS

| | | | |
|---|---|---|---|
| 3,698,541 | 10/1972 | Barr | 198/214 |
| 3,701,512 | 10/1972 | Schippers | 259/191 |
| 3,870,284 | 3/1975 | Kruder | 259/191 |
| 3,946,998 | 3/1976 | Menges | 259/191 |
| 3,989,941 | 11/1976 | Gasior | 259/191 |
| 4,000,884 | 1/1977 | Chung | 259/191 |
| 4,128,341 | 12/1978 | Hsu | 366/89 |
| 4,173,417 | 11/1979 | Kruder | 366/89 |
| 4,201,481 | 5/1980 | Iddon et al. | 366/79 |
| 4,215,978 | 8/1980 | Takayama | 425/190 |
| 4,227,870 | 10/1980 | Kim | 425/208 |
| 4,277,182 | 7/1981 | Kruder | 366/89 |
| 4,285,600 | 8/1981 | Kruder | 366/89 |
| 4,356,140 | 10/1982 | Kruder | 264/211.23 |
| 4,405,239 | 9/1983 | Chung et al. | 366/89 |
| 4,519,712 | 5/1985 | Barr | 366/77 |
| 4,639,143 | 1/1987 | Frankland, Jr. | 366/89 |
| 4,925,313 | 5/1990 | Nunn | 366/81 |
| 5,035,509 | 7/1991 | Kruder | 366/89 |

FOREIGN PATENT DOCUMENTS 57-084830 5/1982 Japan.

OTHER PUBLICATIONS

"Screw design improves plastication, doesn't add head to melt", PM&E, May, 1991.

*Primary Examiner*—David A. Simmons
*Attorney, Agent, or Firm*—Baker & Daniels

[57] ABSTRACT

A plasticating apparatus having a barrel and a screw rotatably disposed therein. The screw has a mixing section including a helical conveying flight to form a helical passage for transporting resinous material along the screw. The mixing section further includes two helical divider flights, each spaced from the conveying flight to divide the helical passage into three channels of varying cyclic depth in the helical direction of the channels. The portions of minimum depth of the channels define wave crests which are helically displaced from each other.

20 Claims, 2 Drawing Sheets

TRIPLE CHANNEL WAVE SCREW

This is a continuation of application Ser. No. 07/714,861, filed Jun. 13, 1991, now U.S. Pat. No. 5,219,590, issued Jun. 15, 1993.

BACKGROUND OF THE INVENTION

This invention relates generally to extruders of the type in which a screw rotatable within a barrel is employed to extrude material to a die or injection mold connected to the outlet end of the barrel. More particularly, the invention is concerned with improvements in high output plasticating extruders and extruders used in reciprocating screw injection molding machines.

A plasticating extruder receives polymer pellets or powder (often together with formulation additives in liquid or particle form), works and raises the temperature of the polymer sufficiently to dispose it in a melted or plastic state, and delivers the melted polymer under pressure through a restricted outlet or die. Ordinarily, it is desirable that the discharge extrudate be fully melted, well mixed, uniform in temperature and pressure, and substantially free of small gels and other fine structure agglomerations. It is also desirable that the rate of delivery of the molten polymer through the die be regulated simply by changing the rate of extruder screw rotation and that the rate of delivery at the selected screw speed be substantially uniform.

The basic extruder apparatus includes an elongated barrel which may be heated or cooled at various locations along its length and a screw which extends longitudinally through the barrel. The screw has a helical conveying land on its surface which cooperates with the cylindrical internal surface of the barrel to define an elongated helical channel.

An extruder screw ordinarily has a plurality of sections which are configurations specifically suited to the attainment of particular functions. Examples are "feed" sections and "metering" sections, which are of basic importance and are present in nearly all plasticating extruders for handling thermoplastic polymers.

A typical extruder screw feed section extends beneath and forwardly from a feed opening where polymer in pellet or powder form is introduced into the extruder to be carried forward along the inside of the barrel by the feed section of the screw. As the material is advanced along the channel, it is worked. This, in turn, generates heat, and melting of the polymer occurs as the material is moved along the feed section and later sections of the screw. Actually, most of the melting typically occurs near the surface of the barrel at the interface between a thin melt film and a solid bed of polymer. This general pattern persists until a substantial portion of the polymer reaches the melted state. It is usually advantageous to employ a tapered transition section between the relatively deep feed section and the shallower metering section. Prior to solid bed breakup, this keeps the solid bed width larger and more tightly pressed against the barrel wall, thereby enhancing the melting rate. After about 40% to 70% of the polymer has been melted, solid bed breakup usually occurs, whereupon particles of solid polymer become dispersed in the polymer melt.

An extruder screw metering section has as its special function the exertion of a pumping action on molten polymer. Ordinarily, the throughput achieved by a screw is considered to be a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. In other words, the drag flow is the volumetric pumping capacity, which is a function only of the product of the helix angle and screw rpm. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component. However, speed may affect such factors as back pressure and material viscosity, which factors, in turn, affect significantly the pressure flow component. On the other hand, pressure flow is directly affected by both the depth and length of the screw channel; an increase in channel depth has a tendency to increase greatly the pressure flow component, and an increase in channel length has a tendency to reduce this back flow component.

It was determined to not rely on the metering section design alone to estimate output except where the section is sufficiently long to dominate the pumping characteristic. In general it takes at least several constant depth turns in the metering section channel to strongly influence the output. Thus, it is beneficial to replace the whole length of a metering section with repetitive cyclic waves, in which each repeating wave cycle reinforces the pumping characteristics of the first in the same manner as each turn at constant depth would reinforce the first.

This led to the single channel wave design described in U.S. Pat. No. 3,870,284, where the constant depth metering section was replaced with repetitive cyclic waves. By utilizing small diameter single wave screws, compression at the high wave crests followed by mixing after each decompression increases the melting rate and promotes heat transfer from the melt to the solid. Because of efficient melting, decreased pressure surging and increased rates of production result.

One problem especially for larger diameter single channel wave screws is that solids may obstruct passage at the wave crests. To solve this problem, a central undercut barrier or divider between out-of-phase cyclic waves has been used to create two helical channels so that a solid-rich fraction of the polymer "jams up" into the wave crest while a melt-rich fraction escapes into the deep channel region across the undercut barrier. This is described in U.S. Pat. No. 4,173,417. Such a design assures greater pressure and output uniformity because at the approach to each wave crest, the melt hydraulic pressure is in direct communication with a deep channel section across the undercut central barrier. Furthermore, there is more sideways mixing and less restrictive wave crest squeezing.

It has also been established that a twin channel wave meter section can be preceded by a solids/melt separation design in the transition section to enhance additional melting prior to entering the double wave. A single or twin channel wave can be used in the transition section before entering the metering section, but the value of the double wave principle has not been established until melting is at least 40% complete. It has been noted that a twin channel wave followed by a mixing tip can withstand much higher extrusion rates than a conventional screw with mixing tip. This is partly because at high speeds, the twin channel wave still melts most, if not all, of the throughput.

In the above-referenced patents there is described an extruder screw whose metering section includes one or two channels following a wave-like cyclical pattern wherein each channel includes periodic wave peaks. The wave portion of the screw performs both metering and mixing functions. Insofar as metering or pumping is concerned, the cyclic wave pattern functions like conventional long metering sections of constant depth in the sense of providing uniform output approximately proportioned to screw rotational speed and providing normal resistance to pressure flow in a rearward direction along the screw channel.

In addition to its good metering properties, the wave portion of the screw has the advantage of achieving good mixing of the polymer without generating excessive heat. In regions of the wave crests, the material is subject to relatively high shear forces so that incompletely melted polymer will be worked and mixed vigorously with the molten material. The material passes from each zone of high shearing action into an adjacent zone of increased channel depth where the heat generating effects are much less intense.

The twin channel wave screw design with a constant pitch undercut barrier has performed effectively to produce high quality melt. Notwithstanding this successful performance, efforts are continuously directed toward increasing mixing and the rate of extrudate production.

SUMMARY OF THE INVENTION

The present invention provides an extruder screw having a combined metering and mixing section, including a helical conveying flight and a pair of helical divider flights, which form three helical flow channels, each channel being of varying depth to form repeating wave cycles.

An advantage of the extrusion screw of the present invention is that resinous material may flow over an additional divider flight and into an additional channel, thereby improving distributive mixing.

Another advantage of the present invention is that the rate of extrudate production can be significantly increased within an acceptable range of maximum temperature and temperature fluctuations.

Yet another advantage of the present invention is that the mixing and circulation of melted and unmelted materials is increased.

A further advantage of the present invention is that the rate of extrudate production is maximized while maintaining acceptable temperature and pressure parameters at the screw tip.

A still further advantage of the present invention is that the occurrence of pressure pulses during extrudate feeding is minimized.

The invention, in one form thereof, comprises a rotating screw disposed within a barrel and being adapted for plasticating resinous material fed into the barrel. The screw has a helical passage formed by a conveying flight to transport the resinous material along the screw. The screw also has a section for mixing and melting the resinous material. This section includes two helical divider flights spaced from the conveying flight to divide the helical passage into three channels of varying cyclic depth in the helical direction of the channels. The portions of minimum depth of the channels define wave crests which are helically displaced from each other.

The invention, in one form thereof, comprises a rotating screw disposed within a barrel and being adapted for plasticating resinous material fed into the barrel. The screw has a helical passage formed by a conveying flight to transport the resinous material along the screw. The screw also has a section for mixing and melting the resinous material. This section includes two helical divider flights spaced from the conveying flight to divide the helical passage into three channels of varying cyclic depth in the helical direction of the channels. The portions of minimum depth of the channels define wave crests which are helically displaced from each other. Similarly, portions of maximum depth of the channels define valleys which are helically displaced from each other.

DESCRIPTION OF THE PREFERRED EMBODIMENT

The portions of a typical extruder are well known to persons skilled in the art, and are disclosed in U.S. Pat. Nos. 3,870,284 and 4,173,417, both of which are assigned to the assignee of the present invention and incorporated herein by reference. The invention can also be incorporated in injection molding machines.

Although the dimensions of the various extruder screws embodying the present invention may vary, a particular set of dimensions are disclosed herein for a particular screw for illustrative purposes. In this example, the screw is a 2.5 inch diameter, 30:1 L/D screw having an 8 L/D squared pitch feed at 0.500 inch depth, an 8 L/D squared pitch transition section, and 2+ turns for "lead-in" and "leadout". The "lead-in" provides a pitch change at 0.165 inch depth. The screw further includes 12 L/D of metering turns.

Figure 1:
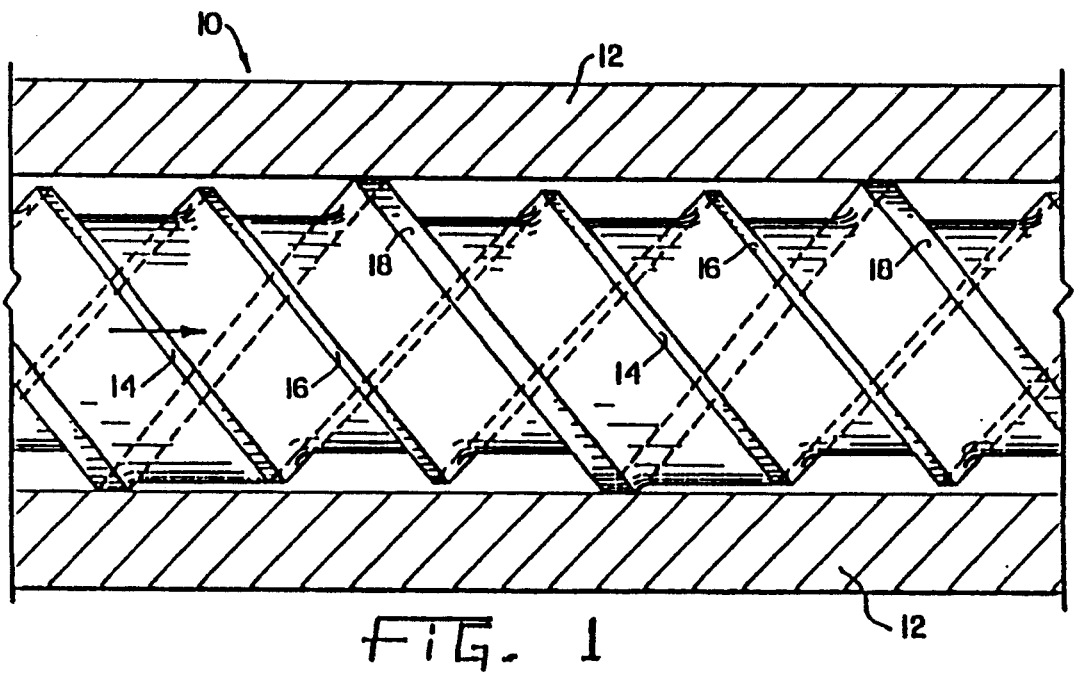
FIG. 1 is a fragmentary, partially sectioned side elevational view of an extruder barrel screw embodying the triple channel wave configuration in accordance with the present invention.

FIG. 1 relates to an extruder screw used in a plasticating extruder machine wherein the wave screw metering section 10, which may be of the single or double stage, is rotatably disposed in barrel 12. Helical barrier or divider flights 14 and 16 divide the flow passage formed by conveying flight 18 of screw 10 into three adjacent channels 20, 22, and 24.

Figure 2:
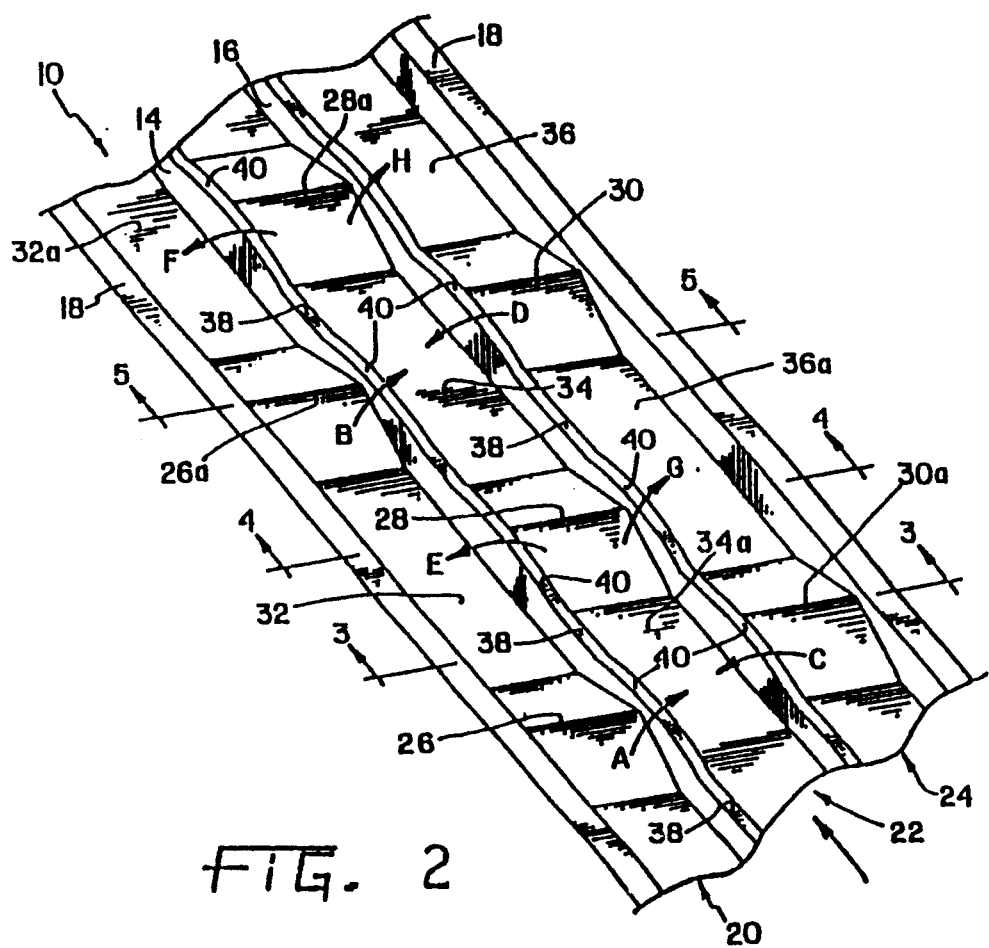
FIG. 2 is an unwrapped channel view of a portion of the wave section depicted in FIG. 1.

Each of channels 20, 22, and 24 has a wave-like pattern. In other words, the depth of each channel (i.e., the distance from the outer edge of the conveying flight to the channel base) varies so that wave crests are formed periodically along each channel. Each wave crest constitutes a channel section of restricted depth. Between wave crests are disposed deeper valley portions. In FIG. 2, crest portions 26, 28, and 30 of channels 20, 22, and 24, respectively, and valley portions 32, 34, and 36 of channels 20, 22, and 24, respectively, are depicted. Like wave crests and valleys 26a, 28a, 30a, 32a, 34a, 36a, are designated in the drawings by related reference numerals.

It is realized that the wave crests are formed by a base surface portion of maximum radius, and the valleys are formed by a base surface portion of minimum radius. By way of example for one screw, the wave peaks occur at 0.080 inch channel depth, and the wave valleys occur at 0.320 inch channel depth. Generally, the maximum depth of each channel is about from 3–5 times the minimum depth of the channel. Although the wave crests and valleys are illustrated in FIG. 2 as having sharply defined changes in elevation, these crests and valleys may be more rounded for ease of machining. Adjacent channels 20, 22, and 24 are arranged wherein the wave crests are offset helically, so that a wave crest of one channel lies adjacent a valley portion of an adjacent channel. In this fashion, melt can be effectively transferred across the divider lands from a channel containing a wave crest to an adjacent channel containing a valley.

The channel wave profiles and may be formed in any suitable manner. For example, the wave profiles may be of continuously varying depth, or of the so-called "flat bottom" type, which are known in the art and disclosed in column 6 of U.S. Pat. No. 4,173,417.

Figure 3:
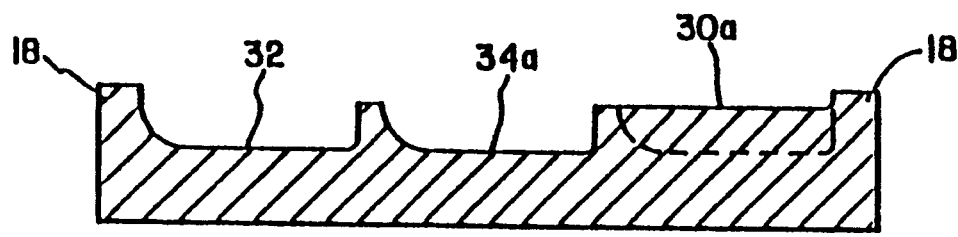
FIG. 3 is an enlarged cross-sectional view of the extruder screw of FIG. 2, taken along line 3—3.
Figure 4:
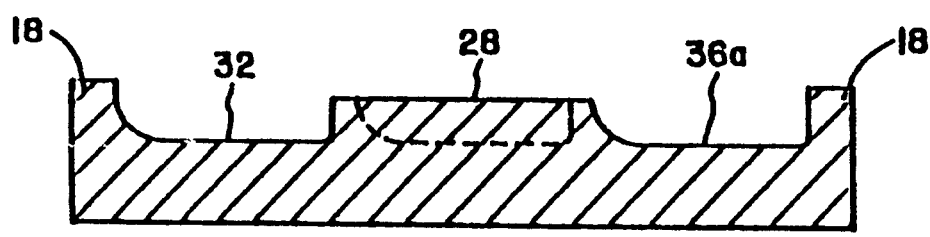
FIG. 4 is an enlarged cross-sectional view of the extruder screw of FIG. 2, taken along line 4—4.
Figure 5:
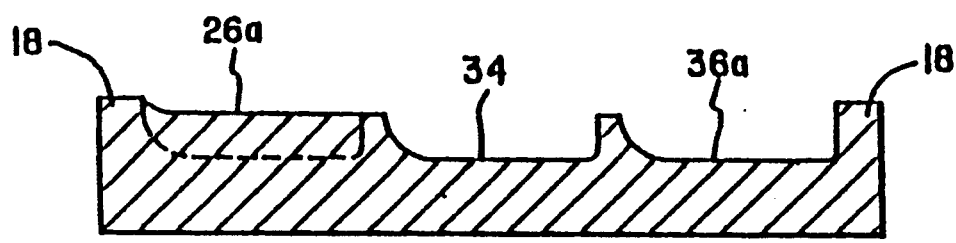
FIG. 5 is an enlarged cross-sectional view of the extruder screw of FIG. 2, taken along line 5—5.

In the embodiment disclosed, each wave cycle extends helically for 360° along the channel, there preferably occurring at least three wave cycles in each channel to minimize pressure fluctuations at the screw tip. Other arrangements, of course, are possible such as spacing the protrusions of each wave cycle by 540°, with an equal number of wave crests disposed on each side of a given channel for balanced distribution along the screw. Preferably, wave cycles of adjacent channels are offset about 120° from one another, so that the wave peaks are "balanced" in three equal spacings around the circumference at about 120°, 240°, and 360°. Referring to FIG. 2, wave crest 28 of channel 22 is offset about 120° from wave crest 26 of adjacent channel 20. Likewise, wave crest 30 of channel 24 is offset about 120° from wave crest 28 of adjacent channel 22. FIGS. 3–5 illustrate that a wave peak in one channel corresponds to a valley in the other two channels.

As shown in FIG. 1, conveying flight 18 continuously wipes the barrel wall at close clearance, and the distance along divider flights 14 and 16 is undercut. In a preferred embodiment, the divider undercut is reduced for a distance generally adjacent each wave peak. This reduced undercut distance is greater on the "pushing" side leading to each wave peak than on the downstream side of each wave peak. To clarify by means of an illustration, most of the undercut distance along the two divider flights is about 0.080 inch. The divider undercut is reduced to about 0.020 inch for about 1.75 inches on the pushing side leading to each wave peak and for about 0.75 inch downstream of the wave peak. This concept is illustrated in FIG. 2, in which reference numeral 38 denotes the undercut divider surfaces that are spaced from the wave peaks (i.e., the 0.080 inch undercut), and reference numeral 40 denotes the reduced undercut surfaces adjacent the wave peaks (i.e., the 0.020 inch undercut). It is recognized that the reduced undercut surfaces shown in FIG. 2 have been exaggerated for illustration purposes.

Referring to FIGS. 1 and 2, it is noted that the width of the outer edge of divider flights 14 and 16 is substantially less than the width of the outer edge of conveying flight 18. More particularly, the divider flight width is preferably less than about 8% of the conveying screw pitch lead and most preferably lies within about 1% to 4% of that pitch. In this fashion, the divider flights are narrow, and little shearing action is imposed upon the melt which is transferred across the divider flights, thereby avoiding excessive energy input, and thus heating, of the melt. This contributes significantly to the acceptable temperatures and temperature variances exhibited by the present invention.

To describe the action of metering section 10, the flow of polymer delivered along the section is considered. Material is conveyed by the rotational action of the upstream, conventional part of the screw and is delivered to the portion of metering section 10 illustrated at the lower portion of FIG. 2. The initiation of divider flights 14 and 16 causes division of the flow, with portions passing into channels 20, 22, and 24. At different points thereafter along screw 10, material cross-flow occurs from regions formed at the wave crests to regions of valleys along the various undercut regions of the divider flights. As shown in FIG. 2, arrows have been drawn to indicate the cross-flow paths. Cross-flow occurs over divider flight 14 from channel 20 to channel 22, as shown by arrows A and B. Similarly, cross-flow occurs over divider flight 16 from channel 24 to channel 22, as shown by arrows C and D. Cross-flow also occurs from channel 22 to channels 20 and 24, as shown by arrows E and F (flow into channel 20), and by arrows G and H (flow into channel 24.

The cross-flow created as a result of the second divider flight allows the resinous material to be better mixed than by conventional twin channel screws. Since the essence of good distributive mixing is the consecutive cutting and redistributing of the mixing material, the added divider flight and channel create more distributive mixing than the twin channel counterpart. In addition, the melting rate of the resinous material is increased since the triple channel design creates more restrictions per unit length of screw. The additional channel provides more wave peaks per unit length of screw, thereby creating even more restrictions to increase melting.

It will be appreciated that the foregoing is presented by way of illustration only, and not by way of any limitation, and that various alternatives and modifications may be made to the illustrated embodiment without departing from the spirit and scope of the invention.

What is claimed is:
1. A plasticating apparatus comprising:
   a barrel having an inlet and an outlet; and
   a rotatable screw disposed within and cooperating with an inner wall of said barrel, said screw adapted for plasticating resinous material fed into said barrel through said inlet;
   said screw having a helical passage formed by a conveying flight to transport resinous material from said inlet toward said outlet;
   said screw having a section for mixing and melting the resinous material, said section including a plurality of helical divider flights spaced from said conveying flight to divide said passage into at least three channels extending helically adjacent along said section, wherein a first of said three channels is positioned between a second channel and a third channel, wherein the width of each of said divider flights is less than the width of said conveying flight, each of said channels having a depth which varies cyclically in a helical direction of such channel, the minimum depth portions of each channel defining wave crests that are displaced helically from each other, wherein said wave crests in said first channel are out of phase with said wave crests in said second and third channels, each of said divider flights being undercut throughout its entire length to provide sufficient clearance between its outermost surface and the inner barrel wall to permit the flow thereover of molten resinous material from a channel containing an area of decreasing depth to an adjacent area of an adjacent channel, wherein the wave crests of said second and third channels are positioned to cause the resinous material to flow simultaneously from said second and third channels into said first channel and from said first channel simultaneously into said second and third channels.

2. The apparatus according to claim 1, wherein each said channel includes a portion of increasing channel depth, a portion of decreasing channel depth, and a portion of constant channel depth, wherein each wave crest in one of said channels is positioned adjacent a portion of constant depth in an adjacent said channel.

3. The apparatus according to claim 1, wherein the wave crests within each channel are separated by about 360 degrees from one another.

4. The apparatus according to claim 1, wherein the maximum depth of each said channel is about three to five times the minimum depth of said channel.

5. The apparatus according to claim 1, wherein the clearance between the outermost surface of each said divider flight and the inner wall of said barrel is about 0.080 inch.

6. The apparatus according to claim 1, wherein each said channel includes a pushing side leading to each said wave crest and an opposite downstream side, wherein said undercut is reduced for a distance adjacent each wave crest, wherein said distance includes a first distance on said pushing side and a second distance on said downstream side of each said wave crest, said first distance being greater than said second distance.

7. The apparatus according to claim 6, wherein said first distance is about 1.75 inches and said second distance is 0.75 inch.

8. The apparatus according to claim 6, wherein said reduced undercut is about 0.020 inch.

9. A screw for plasticating plastic material, said screw including a section for mixing and melting resinous material, said section comprising:
a helical passage formed by a conveying flight to transport resinous material; and
a plurality of helical divider flights spaced from said conveying flight to divide said passage into at least three channels extending helically adjacent along said section, wherein a first of said three channels is positioned between a second channel and a third channel, each of said channels having a depth which varies cyclically in a helical direction of such channel, the minimum depth portions of each channel defining wave crests that are displaced helically from each other, wherein said wave crests in said first channel are out of phase with said wave crests in said second and third channels, each of said divider flights being undercut throughout its entire length to provide sufficient clearance between its outermost surface and the inner barrel wall to permit the flow thereover of molten resinous material from a channel containing an area of decreasing depth to an adjacent area of an adjacent channel, wherein the wave crests of said second and third channels are positioned to cause the resinous material to flow simultaneously from said second and third channels into said first channel and from said first channel simultaneously into said second and third channels.

10. The screw according to claim 9, wherein each said channel includes a portion of increasing channel depth, a portion of decreasing channel depth, and a portion of constant channel depth, wherein each wave crest in one of said channels is positioned adjacent a portion of constant depth in an adjacent said channel.

11. The apparatus according to claim 9, wherein the wave crests within each channel are offset about 360 degrees from one another.

12. The apparatus according to claim 9, wherein the maximum depth of each said channel is about three to five times the minimum depth of said channel.

13. The apparatus according to claim 9, wherein the clearance between the outermost surface of each said divider flight and the inner wall of said barrel is about 0.080 inch.

14. The apparatus according to claim 9, wherein each said channel includes a pushing side leading to each said wave crest and an opposite downstream side, wherein said undercut is reduced for a distance adjacent each wave crest, wherein said distance includes a first distance on said pushing side and a second distance on said downstream side of each said wave crest, said first distance being greater than said second distance.

15. The apparatus according to claim 14, wherein said first distance is about 1.75 inches and said second distance is about 0.75 inch.

16. The apparatus according to claim 14, wherein said reduced undercut is about 0.020 inch.

17. The apparatus according to claim 1, wherein a first wave crest of a first channel is offset about 120 degrees from a downstream adjacent second wave crest in an adjacent second channel, said first and second channels being separated by a first of said divider flights.

18. The apparatus according to claim 17, wherein said second wave crest in said second channel is offset about 120 degrees from a downstream adjacent third wave crest in an adjacent third channel, said second and third channels being separated by a second of said divider flights.

19. The screw according to claim 9, wherein a first wave crest of a first channel is offset about 120 degrees from a downstream adjacent second wave crest in an adjacent second channel, said first and second channels being separated by a first said divider flights.

20. The apparatus according to claim 19, wherein said second wave crest in said second channel is offset about 120 degrees from a downstream adjacent third wave crest in an adjacent third channel, said second and third channels being separated by a second of said divider flights.

* * * * *